United States Patent Office 2,983,165
Patented May 9, 1961

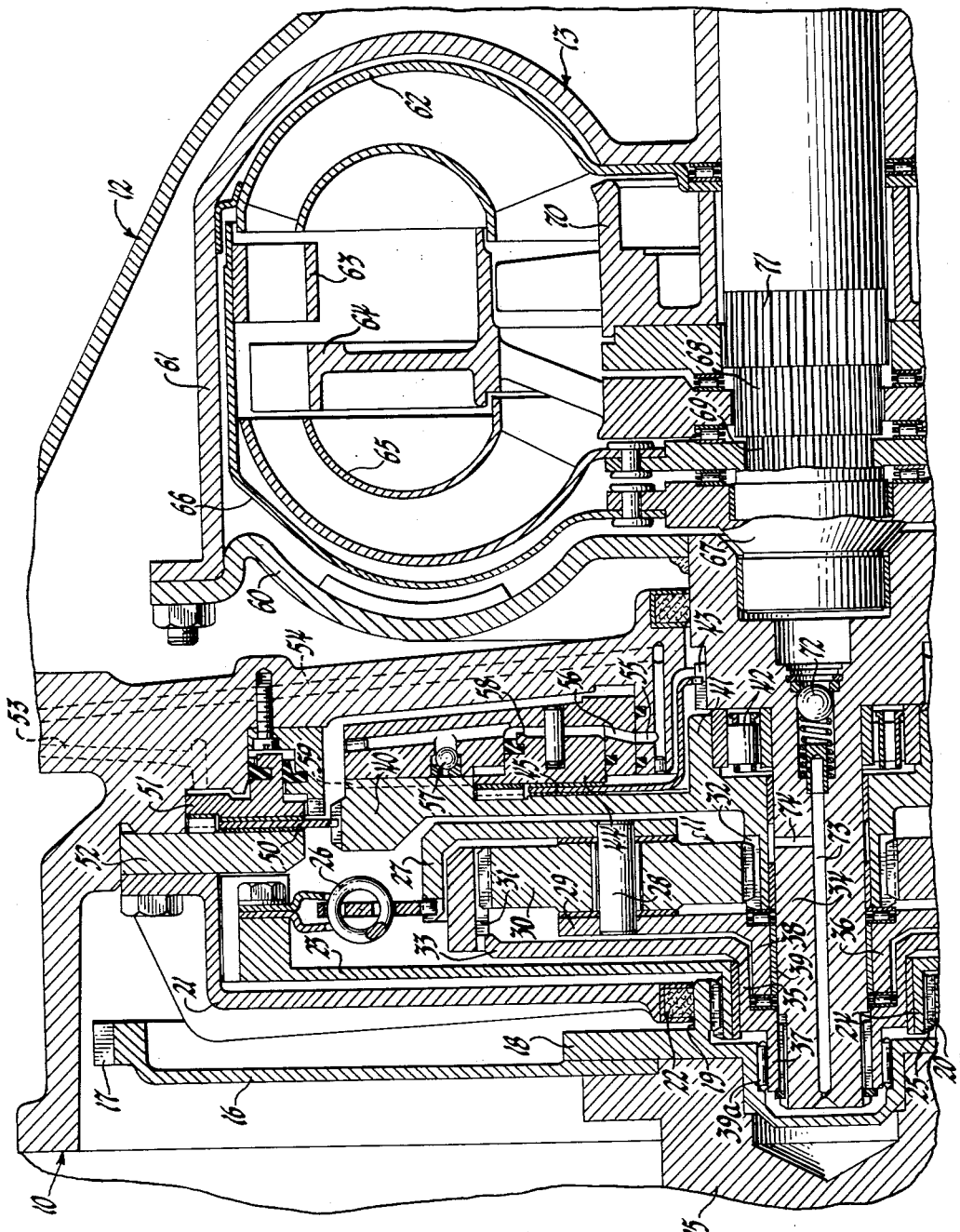

2,983,165
DUAL RANGE TRANSMISSION

Victor C. Moore, Plymouth, and Jack W. Qualman, Birmingham, Mich., assignors to General Motors Corporation, Detroit, Mich., a corporation of Delaware Filed July 25, 1957, Ser. No. 674,236

4 Claims. (Cl. 74—781)

This invention relates to transmissions and more particularly to a transmission incorporating a plural speed drive unit and a hydrodynamic torque transfer mechanism wherein the plural speed drive unit may be conditioned to drive the impeller of the hydrodynamic torque transfer device in either of a pair of selected drive ratios.

An object of this invention is to provide for dual range operation of a hydrodynamic torque transfer device.

An additional object of this invention is to provide a planetary gear set between an engine and an impeller of a hydrodynamic torque transfer device whereby the impeller may be driven in either of two speeds with respect to the speed of the engine.

A further object of this invention is to provide a planetary gear mechanism for connecting an engine driven shaft to an impeller of a hydrodynamic torque transfer device in either one of two selected drive ratios, incorporating a one-way clutch for establishing direct drive together with an additional clutch adapted to be engaged to prevent free-wheeling while coasting.

Another object of this invention is to provide in a two speed planetary gear unit adapted to drive an impeller in either direct or overdrive, a brake manually controllable to brake the planetary unit sun gear against rotation to provide overdrive operation of the impeller.

A further object of this invention is to provide a rotatable drum associated with a gearing unit constructed to provide a relatively heavy mass, the inertia effect of which is employed to provide a smooth transition of shift of drive ratio in the gearing unit.

These and other objects of this invention will be apparent from the following specification and claims taken in conjunction with the accompanying drawing which is a sectional view of a transmission constructed in accordance with the principles of this invention.

Referring to the drawing, a fixed housing 10 encloses a planetary gearing unit indicated generally at 11, and a fixed housing 12 encloses a hydrodynamic torque transfer mechanism indicated generally at 13. The hydrodynamic torque transfer mechanism may be either a fluid coupling or a hydraulic torque converter. The preferred embodiment is of the torque converter type. An engine driven shaft 15 drivingly rotates a flywheel 16 having a ring gear 17 thereon which may cooperate with a starter, not shown, for starting the engine. A hub 18 carried by flywheel 16 has formed thereon a boss 19 having splines 20. Housing 10 has removably attached thereto a plate 21 which carries a seal 22 in contact with boss 19. A drive plate 23 is provided with a boss 24 having splines 25 cooperating with splines 20 to rotate the drive plate. A vibration dampener 26 is bolted to drive plate 23 and splined to a planet carrier 27. A stub shaft 28 extends between planet carrier 27 and planet carrier hub 29. A planet gear 30 mounted on stub shaft 28 mates with a ring gear 31 and a sun gear 32. A drive plate 33 connects ring gear 31 to a shaft 34, the drive plate 33 having an axially extending portion 35 extending between boss 24 and the axially extending boss 36 of carrier hub 29, and a second axially extending splined portion 37 extending between shaft 34 and member 18. Suitable bearings 38, 39 and 39a, which may be sleeves or bushings, are disposed as shown.

Sun gear 32 is carried by a housing 40 which may be braked against rotation, may be connected to drive the impeller drive shaft 34 through a one-way clutch, and may also be connected to drive shaft 34 through a two-way clutch. An annular boss 41 on housing 40 encloses a one-way clutch unit 42 which is arranged to connect sun gear 32 to shaft 34 when power is applied to the planet carrier 27 by engine driven shaft 15. Thus, in normal operation when accelerating or driving the vehicle by the engine, shaft 34 is initially driven at a one to one ratio with respect to the speed or rotation of shaft 15. With the structure described so far, one-way clutch 42 would release whenever shaft 34 would tend to rotate faster than sun gear 32, as would be the case of coasting or descending a long grade with the engine throttle closed. To prevent freewheeling while coasting a single plate overrun clutch 45 splined to shaft 34 and 43 may be applied by a piston 44 to connect shaft 34 to sun gear 32 through housing 40. When clutch 45 is engaged, engine braking may be had on vehicle overrun. When clutch 45 is released, freewheeling will be had when the vehicle tends to overrun the engine.

To provide overdrive operation of shaft 34 sun gear 32 may be held against rotation by means of a disc brake 50. A piston 51 may be applied to force brake disc 50 to engage a brake member 52 carried by fixed housing 10 when overdrive operation is desired. Fluid under pressure may be applied to piston 51 through a passage 53 under control of driver operable valving, not shown. Fluid under pressure may be applied to clutch piston 44 through a passage 54, and ports 55 and 56.

A centrifugal dump valve 57 in housing 40 is operable to connect the piston chamber 58 to exhaust passage 59 after passage 54 is connected to exhaust to make certain that all of the oil is dumped from chamber 58. This prevents centrifugal force effect of oil in chamber 58 from tending to apply clutch 45 when freewheeling is desired.

As shown, shaft 34 driven by planet ring gear 31 is connected to a rotatable drum 61 to drive the same by means of drive member 60. Members 60 and 61 enclose a hydrodynamic torque transfer device which may be either a hydraulic torque converter or a fluid coupling. An impeller 62 is secured to and rotated by drum 61. Three turbines 63, 64 and 65 constitute power output elements. A shell 66 connects turbine 63 to a drive shaft 67. Turbine 64 is connected to an output shaft 68, while turbine 65 is connected to an output shaft 69. A guide wheel 70 is connected to a ground sleeve 71 fixed to the transmission frame. A one-way check valve 72 admits oil to conduits 73 and 74 for lubrication purposes.

In operation, assuming disc brake 50 and disc clutch 45 are each released, impeller 62 is rotated directly at the same speed as that of power input shaft 15. Shaft 15 drives planet carrier 27 through vibration dampener 26 and drive plate 23. Due to loading of shaft 34 and ring gear 31, the ring gear tends to drag so that the planet gear tends to rotate sun gear 32. Sun gear 32 cannot rotate faster than shaft 34 because of the action of one-way clutch 42. It will be understood therefore, that when the engine is doing the driving, both ring gear 31 and sun gear 32 are clutched to shaft 34. The planetary gear unit is, therefore, "locked up" in direct drive. When, however, the shaft 34 tends to overrun sun gear 32, as is true under coast conditions of operation, one-way clutch 42 releases and thereby permits freewheeling. In the event that freewheeling is not desired, clutch 45 may be engaged to lock the sun gear 32 to shaft 34. Under this condition the planetary gearing unit functions in direct drive both under power drive and coast conditions. With clutch 45 engaged, engine braking under coast conditions may be had.

To provide overdrive operation of shaft 34, clutch 45 is released and disc brake 50 applied to hold sun gear 32 stationary. Ring gear 31 and shaft 34 is thereupon rotated at a faster speed of rotation than that of drive shaft 15 as determined by the gear ratio of the planetary gearing unit.

It will be apparent, therefore, that the vehicle operator may select either of two ranges of operation. In direct drive the operator may select freewheel operation or not as desired. Direct drive will permit maximum acceleration and performance. Overdrive will provide maximum economy.

It will be noted that the planetary gearing assembly is extremely compact and conservative of space in that the clutch and brake pistons are located radially and substantially in alignment with respect to each other. The assembly may be quickly and easily assembled and disassembled for service purposes. The arrangement whereby power output member 33 is supported between boss 24 and boss 36 of the two positively rotated members 23 and 29 results in a compact and sturdy structure.

In the embodiment shown, the planetary gearing unit is arranged to provide either direct drive or overdrive of the impeller with respect to the speed of the engine. This arrangement is advantageous in that it permits the use of a smaller sized torque converter for a given capacity than would otherwise be required due to the fact that the impeller is driven faster than the engine in overdrive operation. This arrangement also provides a tighter drive on overrun with less hydraulic slip thereby accomplishing improved overrun engine braking. While the preferred embodiment shown provides for either direct drive or overdrive of the impeller with respect to engine speed, the planetary gearing unit may be modified to accomplish either direct drive or underdrive of the torque converter impeller with respect to engine speed if desired. The drive ratio of the planetary gear set may be controlled by either manually or automatically controlled valving, not shown.

It will be noted that the housing 40 is formed to provide a relatively heavy mass embodying considerable inertia to acceleration or deceleration. This inertia effect of housing 40 is utilized to assist in smoothing up the shift of ratio of the planetary gearing unit 11 to minimize shock to the transmission. Assuming that the area of piston 51 and the pressure supplied to passage 53 are constant, it has been found that by forming the housing 40 with sufficient mass that the engagement of brake 50 requires more time than is true when housing 40 is made of relatively light material. Thus, on shifting from direct drive to overdrive, sun gear 32 is decelerated relatively slowly and cannot be stopped suddenly. In this manner, shock to the transmission upon change of ratio to overdrive is minimized. On the other hand, considering a change in ratio from overdrive to direct drive, due to the relatively heavy mass of housing 40 and its inertia effect, the rate of acceleration of member 40 is relatively slow. Sun gear 32 is therefore gradually accelerated from a standstill upon shift from overdrive to direct drive so that a smooth transition is accomplished. Thus the inertia effect of flywheel 40 is utilized on both upshifts and downshifts to accomplish a smooth change of drive ratio in gear unit 11 without jerks or torque reaction bumps.

What is claimed is:

1. In combination, an engine driven shaft, a power output shaft, a fixed housing forming a chamber therein, a planetary gearing unit disposed in said chamber and including a planet carrier supporting a plurality of planet pinions in mesh with a ring gear and a sun gear, a rotatable housing fixed for rotation with said sun gear and disposed in said chamber, a one-way clutch between said rotatable housing and said power output shaft, a disc brake carried by said rotatable housing and extending outwardly in said chamber for selective engagement with and release from said fixed housing, a piston carried by said fixed housing adapted to selectively engage and release said disc brake, a recess in said rotatable housing, a clutch plate fixed for rotation with said power output shaft and extending into said recess, and a piston carried by said rotatable housing for selectively clutching and declutching said clutch plate to and from said rotatable housing.

2. In a transmission, in combination, a power input shaft, a power output shaft, a housing fixed against rotation forming a chamber therein, said power output shaft extending through said closed chamber, a rotatable housing and a planetary gearing unit disposed in said chamber in side by side relationship, said gear unit including a planet carrier supporting a plurality of planet pinions in mesh with a ring gear and a sun gear, said sun gear being fixed for rotation with said housing, said rotatable housing being supported for rotation on said power output shaft at a point adjacent said sun gear and also rotatably supported by said fixed housing at a point remote from said sun gear, said planet carrier being rotatably supported upon said output shaft at a point adjacent said sun gear, a drive plate connecting said planet carrier to said power input shaft for rotation therewith, a drive plate connecting said ring gear to said output shaft for rotation therewith, said second-mentioned drive plate having a portion thereof extending between said first-mentioned drive plate and said carrier for rotational support of said second drive plate, a one-way clutch between said rotatable housing and said output shaft effective to clutch said rotatable housing to said output shaft when said housing tends to rotate faster than said output shaft and to release said housing from said output shaft when said output shaft rotates faster than said input shaft, a recess in said rotatable housing, a clutch plate fixed for rotation with said output shaft and extending into said recess, a piston carried by said rotatable housing adapted to selectively engage and release said clutch plate, said clutch plate being effective when engaged to establish drive between said rotatable housing and said output shaft irrespective of the relative speeds of rotation of said housing and said output shaft, and an engageable and releasable brake disposed in said chamber effective when engaged to prevent rotation of said rotatable housing and said sun gear.

3. In combination, in a transmission, an engine driven shaft, a power output shaft, a fixed housing forming a chamber therein, a rotatable housing disposed in said chamber, a planetary gearing unit disposed in said chamber, said planetary gearing unit having a planet carrier supported upon said power output shaft for rotation with respect thereto and supporting a plurality of planet gears in mesh with a ring gear and a sun gear, said sun gear being fixed to said rotatable housing for rotation therewith, said sun gear and said rotatable housing being supported for rotation upon said power output shaft, a drive connection between said ring gear and said power output shaft and supported for rotation upon said planet carrier, a drive connection between said carrier and said engine driven shaft and supported for rotation upon the drive connection between the ring gear and said output shaft, a one-way clutch between said rotatable housing and said power output shaft for transmitting power from said rotatable housing to said output shaft, an engageable and releasable brake for braking said rotatable housing and said sun gear against rotation, said brake including a brake disc carried by said rotatable housing and disposed in said chamber, a piston carried by said fixed housing and adapted to engage and release said brake, a two-way engageable and releasable clutch effective when engaged to connect said rotatable housing to said power output shaft, said two-way clutch including a clutch plate fixed for rotation with said power output shaft and extending into said chamber, and a piston carried by said rotatable housing for applying and releasing said two-way clutch.

4. In combination, in a transmission, an engine driven shaft, a power output shaft, a hub rotated by said engine driven shaft, a nonrotatable casing having a removable plate member fixed thereto, said casing and plate member forming a chamber, a planetary gearing unit comprising a planet carrier supporting a plurality of planet gears in mesh with a ring gear and a sun gear disposed in said chamber, means including a drive plate for connecting said planet carrier to said hub, a vibration dampener connecting said planet carrier to said drive plate, said planet carrier having a hub supported for rotation on said power output shaft, a drive plate connecting said ring gear to said power output shaft for rotation therewith, said ring gear drive plate being supported between the hub of said ring gear drive plate and said planet carrier hub, a rotatable housing disposed in said chamber and fixed for rotation with said sun gear, said rotatable housing being supported upon said output shaft, a disc brake carried by said rotatable housing and extending outwardly from said housing, a brake member secured to said nonrotatable housing and extending into said chamber adjacent said disc brake, a piston carried by said fixed housing for applying and releasing said disc brake, a recess in said rotatable housing, a clutch plate fixed to said power output shaft for rotation therewith and extending into said recess, a piston carried by said rotatable housing for selectively engaging and releasing said clutch, and a one-way clutch between the hub of said rotatable housing and said output shaft effective to connect said housing to said power output shaft when said housing tends to rotate faster than said output shaft and effective to release when said power output shaft tends to rotate faster than said housing.

References Cited in the file of this patent

UNITED STATES PATENTS

| | | |
|---|---|---|
| 1,842,798 | Rauen | Jan. 26, 1932 |
| 2,097,021 | De Normanville | Oct. 26, 1937 |
| 2,281,077 | Pollard | Apr. 28, 1942 |
| 2,351,213 | James | June 13, 1944 |
| 2,716,359 | Forster | Aug. 30, 1955 |
| 2,747,433 | Forster | May 29, 1956 |